US007296773B2

(12) United States Patent
Yang

(10) Patent No.: US 7,296,773 B2
(45) Date of Patent: Nov. 20, 2007

(54) STAND FOR HOLDING SILK FLORAL ARRANGEMENTS

(75) Inventor: Rong Teai Yang, Lexington, NC (US)

(73) Assignee: Golden State Silk Flowers, Inc., Charlotte, NC (US)

( * ) Notice: Subject to any disclaimer, the term of this patent is extended or adjusted under 35 U.S.C. 154(b) by 187 days.

(21) Appl. No.: 11/052,678

(22) Filed: Feb. 7, 2005

(65) Prior Publication Data

US 2006/0175497 A1   Aug. 10, 2006

(51) Int. Cl.
*A47K 1/08* (2006.01)

(52) U.S. Cl. .............................. 248/311.2; 248/309.1; 47/41.12; 47/41.1

(58) Field of Classification Search ................ 248/270, 248/311.2, 309.1; 47/41.12, 41.1, 41.01, 47/41.11, 41.14
See application file for complete search history.

(56) References Cited

U.S. PATENT DOCUMENTS

| | | | | |
|---|---|---|---|---|
| 3,183,624 A | * | 5/1965 | Swett ......................... | 47/41.11 |
| 3,481,075 A | * | 12/1969 | Dastoli et al. ............. | 47/41.01 |
| 3,778,929 A | * | 12/1973 | Pearson ................... | 47/58.1 R |
| 6,119,393 A | * | 9/2000 | Wourms et al. ................ | 47/39 |
| 6,874,276 B2 | * | 4/2005 | Morrison ........................ | 47/45 |
| 7,000,347 B2 | * | 2/2006 | Roskin ....................... | 47/41.11 |

\* cited by examiner

*Primary Examiner*—Amy J. Sterling
(74) *Attorney, Agent, or Firm*—Clements Walker; Christopher L. Bernard

(57) ABSTRACT

The present invention provides a stand for holding silk floral arrangements that includes a substantially-tubular piece having a longitudinal axis and defining a first cross-sectional interior area at a first position along the longitudinal axis and a second cross-sectional interior area at a second position along the longitudinal axis. The stand also includes a base piece attached to an end of the substantially-tubular piece, the base piece configured to support the substantially-tubular piece in an upright alignment. The stand further includes a first area-adjustment piece configured to engage the substantially-tubular piece at the first position along the longitudinal axis, the first area-adjustment piece defining a third cross-sectional interior area that is smaller than the first cross-sectional interior area defined at the first position of the substantially-tubular piece. The stand still further includes a second area-adjustment piece configured to engage the substantially-tubular piece at the second position along the longitudinal axis, the second area-adjustment piece defining a fourth cross-sectional interior area that is smaller than the second cross-sectional interior area defined at the second position of the substantially-tubular piece.

10 Claims, 3 Drawing Sheets

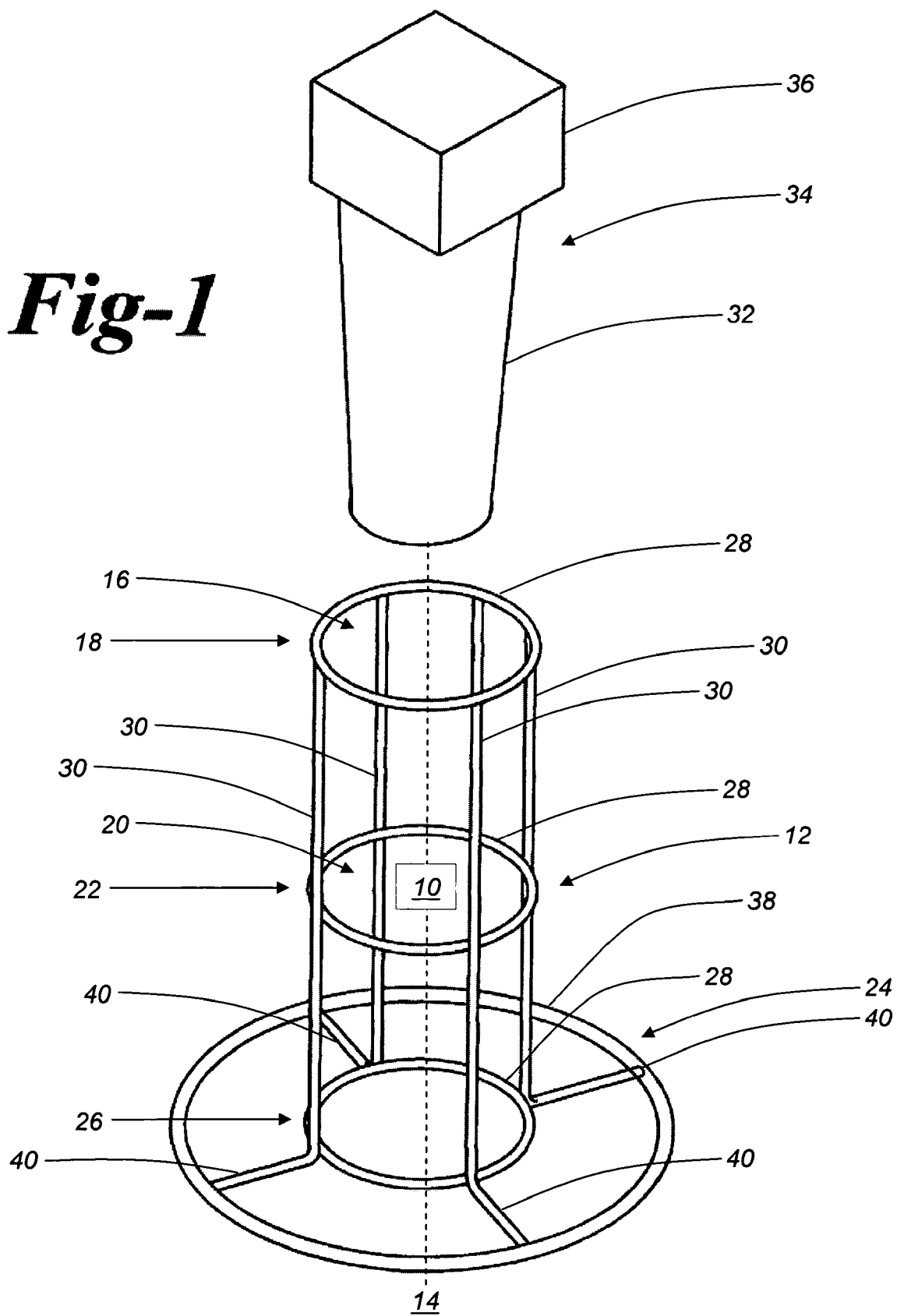

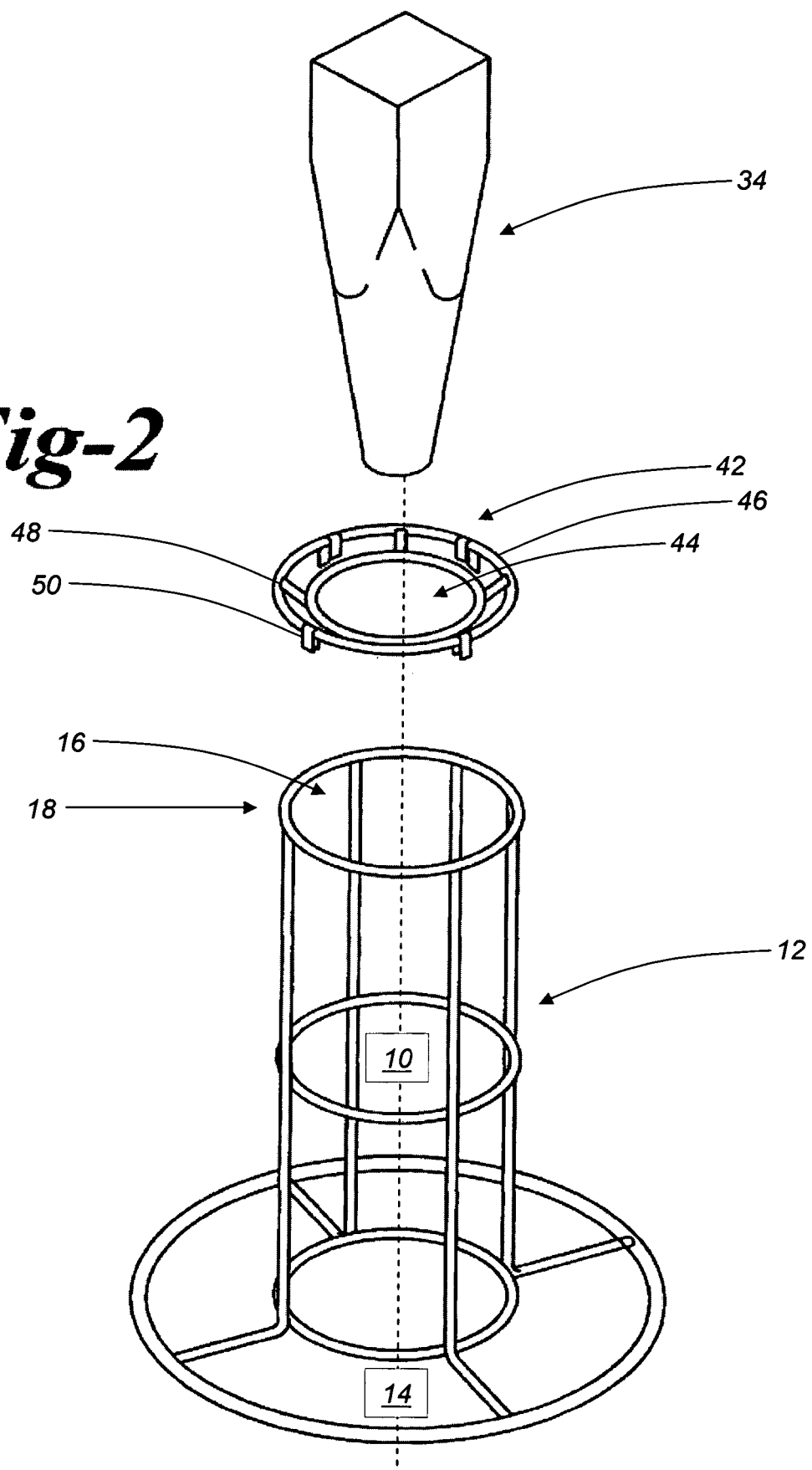

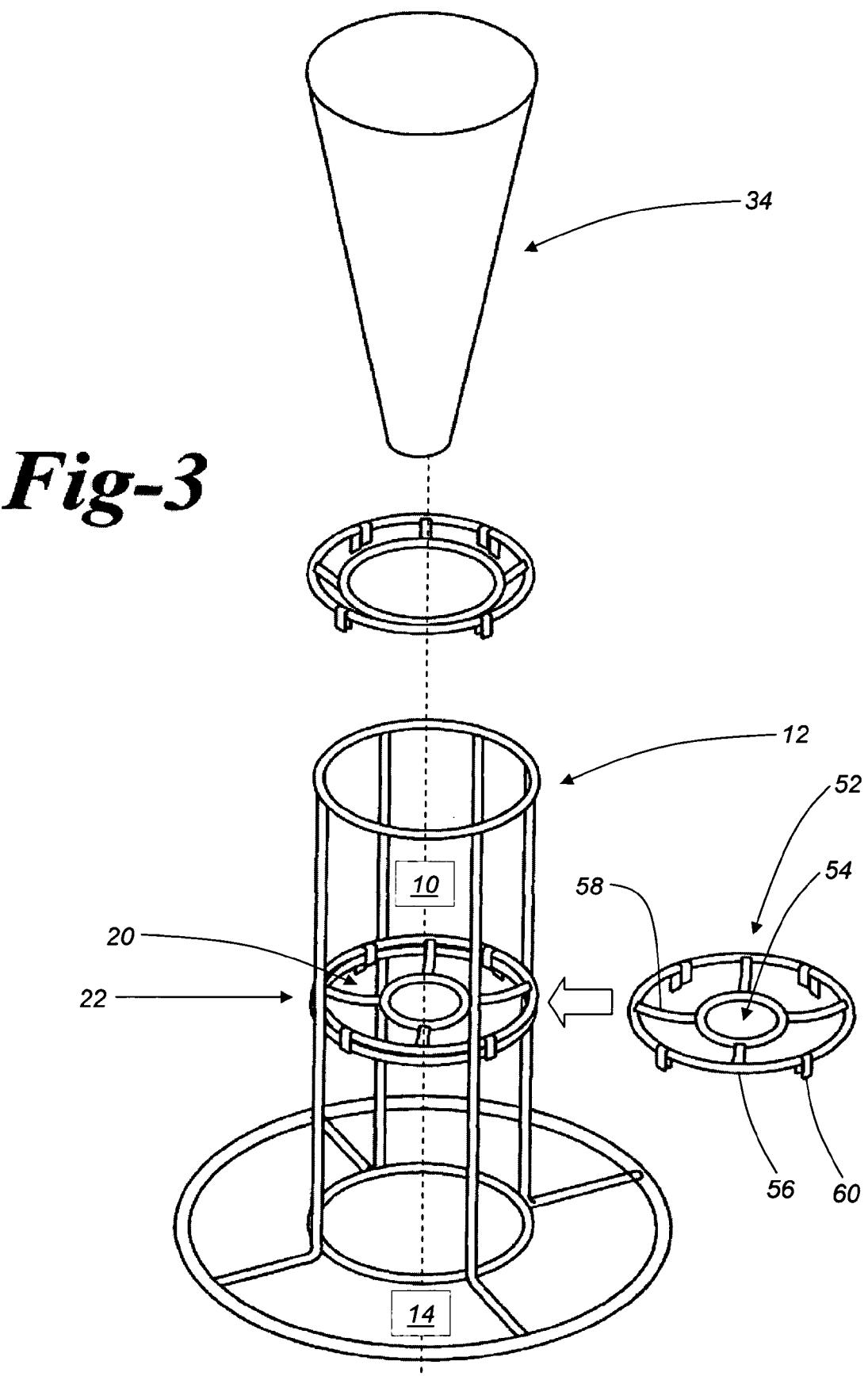

STAND FOR HOLDING SILK FLORAL ARRANGEMENTS

FIELD OF THE INVENTION

The present invention relates generally to equipment for assisting in the assembly, preparation, and/or display of silk floral arrangements and the like. More specifically, the present invention relates to a stand for holding silk floral arrangements and the like during their assembly, preparation, and/or display.

BACKGROUND OF THE INVENTION

Typically, silk floral arrangements and the like are assembled and/or prepared by inserting a plurality of silk flowers, branches with leaves, etc., the stems of which comprise a plurality of covered or uncovered wires or the like, into a rigid foam base. This foam base may have a substantially conical, tapered, or wedge shape. During the assembly and/or preparation process, it is often difficult for a floral arranger to adequately support and/or manipulate the foam base. The floral arranger needs to have his or her hands free to insert and align the plurality of silk flowers, branches with leaves, etc., and this is made difficult if he or she must also support and/or manipulate the foam base.

Typically, floral arrangers have used vases, jars, or crudely-fashioned, homemade stands to support and/or manipulate the foam bases as they assemble and/or prepare their silk floral arrangements and the like. Often, these vases, jars, or homemade stands are also used to display the silk floral arrangements and the like. The problem with using such equipment, however, is that, because the sizes of the foam blocks vary from floral arrangement to floral arrangement, different vases, jars, or homemade stands must be used for each. This results in an inefficient use of time and added expense.

Thus, what is needed is a stand for holding silk floral arrangements and the like during their assembly, preparation, and/or display that is adjustable and capable of easily accommodating a plurality of foam base sizes. This would free the floral arrangers' hands to insert the plurality of silk flowers, branches with leaves, etc. into a silk floral arrangement or the like and align them, while eliminating the inefficient use of time and added expense of having to provide a plurality of different sized vases, jars, or homemade stands.

BRIEF SUMMARY OF THE INVENTION

In various embodiments, the present invention provides a stand for holding silk floral arrangements and the like during their assembly, preparation, and/or display that is adjustable and capable of easily accommodating a plurality of foam base sizes. This frees a floral arranger's hands to insert a plurality of silk flowers, branches with leaves, etc. into the foam base of a silk floral arrangement or the like and align them, while eliminating the inefficient use of time and added expense of having to provide a plurality of different sized vases, jars, or homemade stands.

In one embodiment, the present invention provides a stand for holding silk floral arrangements that includes a substantially-tubular piece having a longitudinal axis and defining a first cross-sectional interior area at a first position along the longitudinal axis of the substantially-tubular piece and a second cross-sectional interior area at a second position along the longitudinal axis of the substantially-tubular piece. The stand also includes a base piece attached to an end of the substantially-tubular piece, the base piece attached perpendicular to the longitudinal axis of the substantially-tubular piece, the base piece configured to support the substantially-tubular piece in an upright alignment. The stand further includes a first area-adjustment piece configured to engage the substantially-tubular piece at the first position along the longitudinal axis of the substantially-tubular piece, the first area-adjustment piece defining a third cross-sectional interior area that is smaller than the first cross-sectional interior area defined at the first position of the substantially-tubular piece. The stand still further includes a second area-adjustment piece configured to engage the substantially-tubular piece at the second position along the longitudinal axis of the substantially-tubular piece, the second area-adjustment piece defining a fourth cross-sectional interior area that is smaller than the second cross-sectional interior area defined at the second position of the substantially-tubular piece.

In another embodiment, the present invention provides a method for manufacturing a stand for holding silk floral arrangements that includes providing a substantially-tubular piece having a longitudinal axis and defining a first cross-sectional interior area at a first position along the longitudinal axis of the substantially-tubular piece and a second cross-sectional interior area at a second position along the longitudinal axis of the substantially-tubular piece. The method also includes attaching a base piece to an end of the substantially-tubular piece, the base piece attached perpendicular to the longitudinal axis of the substantially-tubular piece, the base piece configured to support the substantially-tubular piece in an upright alignment. The method further includes providing a first area-adjustment piece configured to engage the substantially-tubular piece at the first position along the longitudinal axis of the substantially-tubular piece, the first area-adjustment piece defining a third cross-sectional interior area that is smaller than the first cross-sectional interior area defined at the first position of the substantially-tubular piece. The method still further includes providing a second area-adjustment piece configured to engage the substantially-tubular piece at the second position along the longitudinal axis of the substantially-tubular piece, the second area-adjustment piece defining a fourth cross-sectional interior area that is smaller than the second cross-sectional interior area defined at the second position of the substantially-tubular piece.

BRIEF DESCRIPTION OF THE DRAWINGS

The present invention is illustrated and described herein with reference to various drawings, in which like reference numbers denote like components, parts, or steps, and in which:

FIG. 1 is a perspective view of one embodiment of the stand for holding silk floral arrangements of the present invention;

FIG. 2 is another perspective view of the stand for holding silk floral arrangements of FIG. 1, the configuration illustrated incorporating and using a first area-adjustment piece; and FIG. 3 is a further perspective view of the stand for holding silk floral arrangements of FIGS. 1 and 2, the configuration illustrated incorporating and using the first area-adjustment piece and a second area-adjustment piece.

DETAILED DESCRIPTION OF THE INVENTION

Referring to FIG. 1, in one embodiment of the present invention, a stand for holding silk floral arrangements 10 includes a substantially-tubular piece 12 having a longitudinal axis 14 and defining a first cross-sectional interior area 16 at a first position 18 along the longitudinal axis 14 of the substantially-tubular piece 12 and a second cross-sectional interior area 20 at a second position 22 along the longitudinal axis 14 of the substantially-tubular piece 12. The stand 10 also includes a base piece 24 attached to an end 26 of the substantially-tubular piece 12, the base piece 24 attached perpendicular to the longitudinal axis 14 of the substantially-tubular piece 12, the base piece 24 configured to support the substantially-tubular piece 12 in an upright alignment.

The substantially-tubular piece 12 may have any suitable cross-sectional shape (which may, optionally, be variable along the longitudinal axis 14) and may comprise a solid or partially-solid-walled structure. For example, in the embodiment illustrated, the substantially-tubular piece 12 comprises a plurality of ring members 28 disposed concentrically about the longitudinal axis 14 and a plurality of straight members 30 disposed parallel to the longitudinal axis 14. The plurality of ring members 28 are connected together and held in a fixed relationship with respect to one another by the plurality of straight members 30. The plurality of ring members 28 and the plurality of straight members 30 are made of a substantially-rigid material, such as metal, wood, or plastic, and are connected together using welds, an adhesive, mechanical fasteners, etc.

Preferably, the plurality of ring members 28 and the plurality of straight members 30 each have a thickness or diameter of between about 1/8 in. and about 1/2 in., although another suitable dimension may be used. Preferably, the substantially-tubular piece 12 has an overall height of between about 3 in. and about 18 in. and a cross sectional area (which may, optionally, be variable along the longitudinal axis 14) of between about 1 sq. in. and about 20 sq. in., although other suitable dimensions may be used. The cross-sectional shape and area of the substantially-tubular piece 12 are selected such that the substantially-tubular piece is capable of receiving the lower portion 32 of the rigid foam base 34 associated with a silk floral arrangement or the like, while supporting the upper portion 36.

The base piece 24 attached to the end 26 of the substantially-tubular piece 12 may comprise a solid or wire-frame structure. For example, in the embodiment illustrated, the base piece 24 comprises a ring member 38 welded, adhered, or mechanically fastened to radially-extending portions 40 of the plurality of straight members 30. Preferably, the base piece 24 has a size and shape that are sufficient to support the substantially-tubular piece 12 in an upright alignment, especially when a silk floral arrangement or the like is disposed partially within the substantially-tubular piece 12.

Referring to FIG. 2, the stand for holding silk floral arrangements 10 also includes a first area-adjustment piece 42 configured to engage the substantially-tubular piece 12 at the first position 18 along the longitudinal axis 14 of the substantially-tubular piece 12, the first area-adjustment piece 42 defining a third cross-sectional unobstructed interior area 44 that is smaller than the first cross-sectional interior area 16 defined at the first position 18 of the substantially-tubular piece 12. The first area-adjustment piece 42 may comprise a solid or wire-frame structure. For example, in the embodiment illustrated, the first area-adjustment piece 42 comprises a plurality of ring members 46 of varying interior diameter joined together by a plurality of spanning members 48. The first area-adjustment piece 42 is secured relative to the first position 18 of the substantially-tubular piece 12 via a plurality of attachment mechanisms 50, such as a plurality of metal tabs, clips, or the like.

Referring to FIG. 3, the stand for holding silk floral arrangements 10 further includes a second area-adjustment piece 52 configured to engage the substantially-tubular piece 12 at the second position 22 along the longitudinal axis 14 of the substantially-tubular piece 12, the second area-adjustment piece 52 defining a fourth cross-sectional interior area 54 that is smaller than the second cross-sectional interior area 20 defined at the second position 22 of the substantially-tubular piece 12. The second area-adjustment piece 52 may comprise a solid or wire-frame structure. For example, in the embodiment illustrated, the second area-adjustment piece 52 comprises a plurality of ring members 56 of varying interior diameter joined together by a plurality of spanning members 58. The second area-adjustment piece 52 is secured relative to the second position 22 of the substantially-tubular piece 12 via a plurality of attachment mechanisms 60, such as a plurality of metal tabs, clips, or the like.

Referring to FIGS. 2 and 3, in one exemplary configuration of the stand for holding silk floral arrangements 10 of the present invention, the fourth cross-sectional interior area 54 defined by the second area-adjustment piece 52 is smaller than the third cross-sectional interior area 44 defined by the first area-adjustment piece 42. In another exemplary configuration of the stand for holding silk floral arrangements 10 of the present invention, the first cross-sectional interior area 16 defined at the first position 18 of the substantially-tubular piece 12 is equal to the second cross-sectional interior area 20 defined at the second position 22 of the substantially-tubular piece 12.

In general, the stand for holding silk floral arrangements 10 (FIG. 1) may be selectively used with or without the first area-adjustment piece 42 (FIG. 2) and/or the second area-adjustment piece 52 (FIG. 3) depending upon the size and shape of the foam base 34 (FIGS. 1-3) used. For example, the size and shape of the foam base 34 of FIG. 1 require that neither the first area-adjustment piece 42 nor the second area-adjustment piece 52 be used. The size and shape of the foam base 34 of FIG. 2 require that only the first area-adjustment piece 42 be used. Finally, the size and shape of the foam base 34 of FIG. 3 require that both the first area-adjustment piece 42 and the second area-adjustment piece 52 be used. This illustrates the flexibility of the apparatus of the present invention.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A stand for holding silk floral arrangements that accommodates a plurality of sizes of floral bases, comprising:
    a substantially-tubular piece having a longitudinal axis and comprising a first ring member disposed concentrically about the longitudinal axis defining a first cross-sectional interior area at a first position along the longitudinal axis of the substantially-tubular piece and a second ring member disposed concentrically about the longitudinal axis defining a second cross-sectional interior area at a second position along the longitudinal axis of the substantially-tubular piece;

a base piece attached to an end of the substantially-tubular piece, the base piece attached perpendicular to the longitudinal axis of the substantially-tubular piece, the base piece configured to support the substantially-tubular piece in an upright alignment; and a first area-adjustment piece selectively and removably secured to the first ring member at the first position along the longitudinal axis of the substantially-tubular piece, the first area-adjustment piece defining a third cross-sectional interior area with an open center that is smaller than the first cross-sectional interior area defined by the first ring member at the first position along the longitudinal axis of the substantially-tubular piece; and wherein the cross-sectional interior areas are configured to receive a lower portion of a floral base and support an upper portion of the floral base.

2. The stand for holding silk floral arrangements of claim 1, further comprising a second area-adjustment piece configured to engage the substantially-tubular piece at the second position along the longitudinal axis of the substantially-tubular piece, the second area-adjustment piece defining a fourth cross-sectional interior area that is smaller than the second cross-sectional interior area defined at the second position of the substantially-tubular piece.

3. The stand for holding silk floral arrangements of claim 2, wherein the fourth cross-sectional interior area defined by the second area-adjustment piece is smaller than the third cross-sectional interior area defined by the first area-adjustment piece.

4. The stand for holding silk floral arrangements of claim 1, wherein the first cross-sectional interior area defined by the first ring member at the first position along the longitudinal axis of the substantially-tubular piece is equal to the second cross-sectional interior area defined by the second ring member at the second position along the longitudinal axis of the substantially-tubular piece.

5. The stand for holding silk floral arrangements of claim 1, wherein the substantially-tubular piece comprises a plurality of ring members disposed concentrically about the longitudinal axis.

6. The stand for holding silk floral arrangements of claim 5, wherein the substantially-tubular piece further comprises a plurality of straight members disposed parallel to the longitudinal axis and connecting the plurality of ring members together.

7. The stand for holding silk floral arrangements of claim 6, wherein the plurality of ring members and the plurality of straight members are made of a material selected from the group consisting of metal, wood, and plastic.

8. The stand for holding silk floral arrangements of claim 1, wherein the first area-adjustment piece comprises an inner ring member disposed concentrically within an outer ring member, the inner ring member defining the third cross-sectional interior area with the open center.

9. The stand for holding silk floral arrangements of claim 2, wherein the second area-adjustment piece comprises an inner ring member disposed concentrically within an outer ring member, the inner ring member defining the fourth cross-sectional interior area.

10. The stand for holding silk floral arrangements of claim 2, wherein the first area-adjustment piece and the second area-adjustment piece engage and are secured relative to the first position of the substantially-tubular piece and the second position of the substantially-tubular piece, respectively, via a plurality of attachment mechanisms.

* * * * *